(No Model.)  2 Sheets—Sheet 1.

J. P. LAVIGNE.
MECHANICAL MOVEMENT.

No. 296,977.  Patented Apr. 15, 1884.

Witnesses:

Jos. P. Lavigne, Inventor,
By Atty (No Model.) 2 Sheets—Sheet 2.

J. P. LAVIGNE.
MECHANICAL MOVEMENT.

No. 296,977. Patented Apr. 15, 1884.

Witnesses.
J. H. Shumway
Jos. A. Earle

Joseph P. Lavigne
Inventor
By Atty.
John A. Earle

UNITED STATES PATENT OFFICE.

JOSEPH P. LAVIGNE, OF NEW HAVEN, CONNECTICUT, ASSIGNOR TO JOSEPH S. SACKETT AND JANE HALLIWELL, BOTH OF SAME PLACE.

MECHANICAL MOVEMENT.

SPECIFICATION forming part of Letters Patent No. 296,977, dated April 15, 1884.

Application filed January 28, 1884. (No model.)

*To all whom it may concern:*

Be it known that I, JOSEPH P. LAVIGNE, of New Haven, in the county of New Haven and State of Connecticut, have invented a new Improvement in Mechanical Movements; and I do hereby declare the following, when taken in connection with accompanying drawings and the letters of reference marked thereon, to be a full, clear, and exact description of the same, and which said drawings constitute part of this specification, and represent, in—

Figure 1:
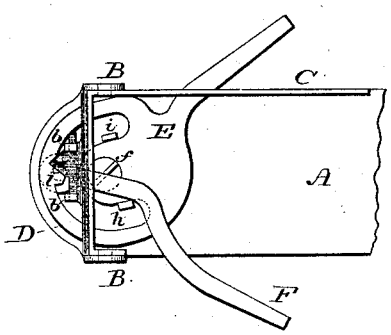
Figure 2:
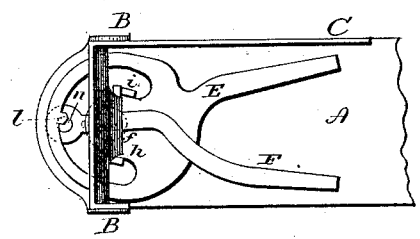
Figure 3:
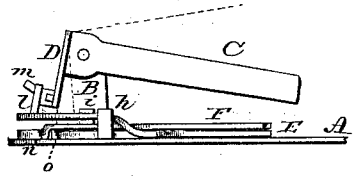
Figure 5:
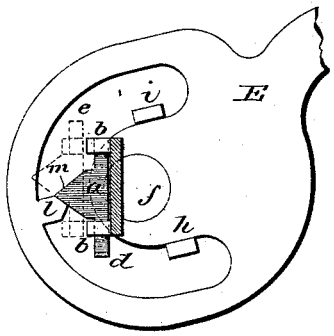
Figure 7:
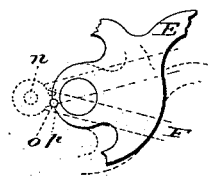
Figure 6:
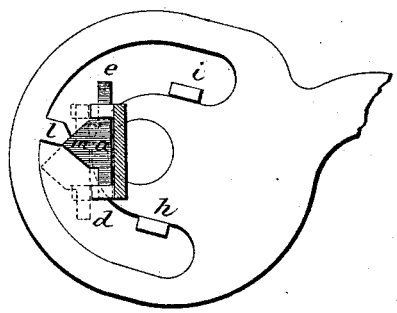
Figure 8:
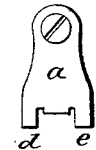
Figure 9:
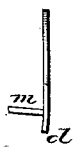
Figure 4:
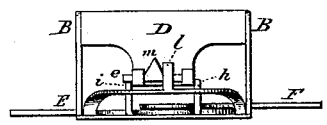

Figure 1, a top or plan view, showing the levers E F at one extreme of vibration; Fig. 2, the same, showing the levers E F at the other extreme of vibration; Fig. 3, a side view; Fig. 4, a rear view; Figs. 5 and 6, top views, enlarged, of the lever E and of the dog, to better illustrate the operation; Fig. 7, a detached view, showing the connection between the levers E and F; Figs. 8 and 9, modifications.

This invention relates to an improvement in mechanical movements, the object of the invention being to convert a reciprocating movement into a vibratory movement in a plane at right angles to the reciprocating movements, the movement being applicable to various purposes; and the invention consists in a vibrating lever to which the reciprocating motion is imparted, the vibration of the said lever being in the same plane as the reciprocating movement, combined with a lever hung to vibrate in a plane at right angles to the plane of said vibrating lever receiving the reciprocating motion, a dog on said first-mentioned lever and arranged to be moved to the right and left of a central line through said second lever, and in a plane across the plane of said second lever, said second lever constructed with shoulders each side of its pivot and forward of the dog, and also constructed with a stud in rear of the dog, whereby in the movement of the said first lever in one direction the said dog will strike said stud and be thrown into a position that in the reverse movement of said first lever it will engage one of the shoulders on said second lever, then in the next movement of said first lever the dog will be thrown in the opposite direction, to engage the other stud on said second lever, whereby that second lever will be returned, and thus one full vibrating movement be imparted to said second lever to two full vibrating movements of said first lever, and as more fully hereinafter described.

For convenience of illustration, I show the invention as arranged upon a base, A, upon which, in suitable bearings, B, a lever, C, is hung, and to which a vibratory movement is imparted, say, in a vertical plane, as indicated in broken lines, Fig. 3. This vibratory movement may be imparted by a crank or other equivalent devices for imparting reciprocating movement. From the lever C an arm, D, extends downward toward the base. At its lower end this arm carries a dog, $a$, arranged to slide at right angles to the plane of the lever C, in suitable bearings, $b\ b$, formed on said arm, and so that in one extreme, as seen in Fig. 5, one end, $d$, of the dog will project beyond its bearing, and at the other extreme the other end, $e$, will project beyond its bearing, as seen in Fig. 5. The movement from one position to the other as it forces one arm outward draws the other inward. On the base, or so as to swing in a plane at right angles to the plane of the lever C, a second lever, E, is hung upon a pivot, $f$. This pivot should be in about the vertical plane of the pivots of the lever C. Near the hub of the lever E, shoulders or projections $h\ i$ extend upward— one upon one side and the other upon the opposite side of the central line of the lever—as seen in Figs. 4 and 5. These shoulders or projections $h\ i$ stand in the path of the ends of the dog $a$. Supposing the lever E to stand in the position seen in Fig. 5, the lever C down, as seen in Fig. 3, and with the end $e$ of the dog projecting, as seen in broken lines, Fig. 5, as the lever C rises the end $e$ of the dog will strike the shoulder $i$ of the lever E, and as the ascent of the lever C continues the dog will advance until it has turned the lever E from its position seen in Fig. 5 to that seen in Fig. 6, or as from the position seen in Fig. 1 to that seen in Fig. 2. Then as the lever C descends it carries the dog rearward, and then the dog is thrown to force the end $d$ outward and draw the end $e$ inward, and so that the end $d$ projects, as seen in broken lines, Fig. 6. Then as the lever C next rises the end $d$ of the dog will strike the shoulder $h$ and return the lever from the position seen in Figs. 2 and 6 to the position seen in Figs. 1 and 5. Then the lever C returns as before. Thus, in two full vibrations of the lever C a single full vibration has been imparted to the lever E, and in a plane at right angles to the plane of the lever C.

To automatically throw the dog from right to left, the lever E, in rear of the pivot or fulcrum $f$, is constructed with an upwardly-projecting stud, $l$, in substantially the central line. This stud stands at the rear of the dog. The dog is provided with a cam-shape or double-inclined projection, $m$, and so as to work in the same plane as the stud $l$. The lever E standing in the position seen in Figs. 1 and 5 when the lever C descends and carries the dog rearward, the inclined side of the dog strikes the stud $l$, which is at that time on the side where the end $d$ is projecting, and as the lever C continues its descent, the dog will, because of the stud $l$, which is then stationary, be forced from its position, as seen in solid lines, Fig. 5, to the position seen in broken lines, same figure, and whereby the end $d$ will be drawn inward and the end $e$ caused to project. Then as the lever C rises the projecting end $e$ will operate upon the lever E as before, turning it to the opposite position, as seen in Figs. 2 and 6, and carry the stud $l$ to the opposite side of the central line. Then as the lever C next descends, the opposite inclined side of the projecting end $m$ of the dog will strike the opposite side of the stud, as seen in Fig. 6, and as the lever C completes its descent the dog will be returned, causing the end $d$ to project and the end $e$ to be drawn in, as seen in broken lines, Fig. 6. Thus at each descent of the lever C the dog is automatically moved first to one side and then to the opposite side, so as to bring the ends respectively into position to strike the shoulders $h\ i$. In some cases it is desirable to impart a vibratory movement to a pair of levers. In this case, a second lever, F, is hung to the base in rear of the pivot $f$, and as at $n$, the lever F extending forward over the lever E, and is engaged with the hub of the lever E by a tooth, $o$, on the one engaging a corresponding notch, $p$, in the other, as seen in Fig. 7, and so that as the lever E turns from one direction to the other, as seen in Fig. 7, it will correspondingly turn the second lever, F, and so that the levers will approach each other in one movement, as seen in Fig. 2, and separate in the opposite movement, as seen in Fig. 1.

Instead of making the dog to slide at right angles to the plane of vibration of the lever C, it may be hung to the lever between its pivots, as seen in Fig. 8, and so as to swing to the right and left in a plane at right angles to the plane of the lever C, and so as to bring the projections $d\ e$ respectively into position to engage the shoulders $h\ i$ on the lever E, as before described for the ends $d\ e$ of the dog. In this construction, on the back of the dog, the cam-like projection $m$ is arranged, as in the first illustration, and as seen in Fig. 9.

I claim—

1. The combination of the lever C, arranged for vibratory movement, the lever E, arranged for vibratory movement in a plane at right angles to the plane of the lever C, a dog, $a$, on said lever C, and arranged to be moved in a plane at right angles to the plane of the lever C, and the lever E, constructed with shoulders $h\ i$ forward of the dog on opposite sides of the pivot of the said lever E, and with a stud, $l$, in rear of the dog, whereby in the vibratory movement of the lever E the said stud is thrown to the right and left of the dog, the dog constructed to engage said stud in each vibratory movement of the lever C, whereby the dog will be thrown from side to side and engage one of said shoulders $h\ i$ in each full vibration of said lever C, and whereby two full vibrations of the lever C will impart but a single full vibration to the lever E, substantially as described.

2. The combination of the lever C, arranged for vibratory movement, the lever E, arranged for vibratory movement in a plane at right angles to the plane of vibration of the lever C, and the dog $a$, arranged in bearings in said lever C in a plane at right angles to the plane of vibration of said lever C, and so as to slide from right to left, the said dog constructed with a projection, $m$, the lever E constructed with shoulders $h\ i$ forward of the dog and each side of the pivot of said lever E, and with a stud, $l$, in rear of the pivot and of the dog, whereby in each movement of the lever C in one direction the said projection $m$ will strike the stud $l$ on the lever E and force said dog to the right or left, as the case may be, and whereby one end of the said dog will engage one of said shoulders on the lever E in one movement of the lever C, and in the next movement in the same direction the opposite end of the dog will engage the opposite shoulder, substantially as described.

3. The combination of the lever C, arranged for vibratory movement, the lever E, arranged for vibratory movement in a plane at right angles to the plane of the lever C, a dog, $a$, on said lever C, and arranged to be moved in a plane at right angles to the plane of the lever C, the lever E constructed with shoulders $h\ i$ forward of the dog on opposite sides of the pivot of the said lever E, and with a stud, $l$, in rear of the dog, whereby in the vibratory movement of the lever E the said stud is thrown to the right and left of the dog, the dog constructed to engage said stud in each vibratory movement of the lever C, whereby the dog will be thrown from side to side and engage one of said shoulders $h\ i$ in each full vibration of said lever C, and whereby two full vibrations of the lever C will impart but a single full vibration to the lever E, and the lever F, pivoted to the base in rear of the pivot of the lever E and in connection with the said lever E, whereby the movement of the lever E in one direction imparts a movement to the lever F in the opposite direction and in the same plane, substantially as described.

JOSEPH P. LAVIGNE.

Witnesses:
 JOHN E. EARLE,
 JOS. C. EARLE.